（12）United States Patent
Muendel et al.

(10) Patent No.: US 9,377,667 B2
(45) Date of Patent: Jun. 28, 2016

(54) CASCADED OPTICAL HARMONIC GENERATION

(71) Applicant: Lumentum Operations LLC, Milpitas, CA (US)

(72) Inventors: Martin H. Muendel, Oakland, CA (US); James J. Morehead, Oakland, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/719,617

(22) Filed: May 22, 2015

(65) Prior Publication Data

US 2015/0338719 A1 Nov. 26, 2015

Related U.S. Application Data

(60) Provisional application No. 62/002,006, filed on May 22, 2014.

(51) Int. Cl.
| | |
|---|---|
| G02F 1/35 | (2006.01) |
| H01S 3/10 | (2006.01) |
| H01S 3/00 | (2006.01) |
| G02F 1/355 | (2006.01) |
| G02F 1/37 | (2006.01) |
| H01S 3/109 | (2006.01) |

(52) U.S. Cl.
CPC .............. *G02F 1/353* (2013.01); *G02F 1/3551* (2013.01); *G02F 1/37* (2013.01); *H01S 3/0092* (2013.01); *H01S 3/109* (2013.01); *G02F 2001/354* (2013.01); *G02F 2203/055* (2013.01)

(58) Field of Classification Search
None
See application file for complete search history.

(56) References Cited

U.S. PATENT DOCUMENTS

| | | | |
|---|---|---|---|
| 5,452,312 A | 9/1995 | Yamamoto et al. | |
| 5,850,407 A | 12/1998 | Grossman et al. | ............ 372/22 |
| 6,047,011 A * | 4/2000 | Cook | ........................ G02F 1/37 |
| | | | 359/327 |
| 2008/0158638 A1* | 7/2008 | Furuya | ..................... G02F 1/37 |
| | | | 359/237 |
| 2009/0161703 A1 | 6/2009 | Seelert et al. | |
| 2013/0077086 A1* | 3/2013 | Chuang | .............. G01N 21/9501 |
| | | | 356/51 |
| 2014/0362880 A1* | 12/2014 | Chuang | ................. G02F 1/3558 |
| | | | 372/22 |

FOREIGN PATENT DOCUMENTS

| | | |
|---|---|---|
| JP | H03-145777 A | 6/1991 |
| JP | 2000343261 A * | 12/2000 |
| WO | WO 2010/111094 A2 | 9/2010 |

OTHER PUBLICATIONS

Wang et al., "High Power Q-switched $TEM_{00}$ Mode Diode-Pumped Solid State Lasers with > 30W Output Power at 355nm", Invited Paper, Proc of SPIE, vol. 6100, 610019-1 to 13, Feb. 2006.
European Search Report corresponding to EP 15 16 8631, mailed Oct. 28, 2015, 7 pages.

* cited by examiner

*Primary Examiner* — Hemang Sanghavi
(74) *Attorney, Agent, or Firm* — Harrity & Harrity, LLP

(57) ABSTRACT

Cascaded optical harmonic generators and methods for cascaded optical harmonic generation are disclosed. Relative disposition of individual harmonic generators of a cascaded harmonic generator in an optical path of the fundamental optical beam may be reversed. In a third harmonic generator, the fundamental optical beam may enter the third harmonic crystal first, and the second harmonic crystal second. When the fundamental optical beam enters the third harmonic crystal first, the fundamental light may remain non-depleted by second harmonic generation process.

24 Claims, 9 Drawing Sheets

_US 9,377,667 B2_

CASCADED OPTICAL HARMONIC GENERATION

CROSS-REFERENCE TO RELATED APPLICATIONS

The present invention claims priority from U.S. Provisional Patent Application No. 62/002,006 filed May 22, 2014, which is incorporated herein by reference.

TECHNICAL FIELD

The present disclosure relates to light sources, and in particular to devices and methods for cascaded optical harmonic generation.

BACKGROUND

Optical harmonic generation may be used to convert laser light from one wavelength to a shorter wavelength, i.e. a higher frequency. For example, frequency doubling, or second harmonic generation ("SHG"), may be used to obtain visible light from near infrared light. In addition, frequency tripling, also referred to as third harmonic generation ("THG"), may be used to obtain blue, violet, and ultraviolet (UV) light from near infrared light. The frequency doubled and tripled light may then be used for spectroscopy, materials processing, optical pumping, etc.

The optical frequency of laser light may be tripled using cascaded nonlinear optical crystals. Referring to FIG. 1, a prior-art cascaded harmonic tripler 10 is shown as an example. The cascaded harmonic tripler 10 includes sequentially disposed second harmonic 12 and third harmonic 13 crystals, and a dichroic mirror (or filter) 15. In operation, a fundamental light beam 11 at optical frequency $\omega$ impinges on the second harmonic crystal 12. Since a nonlinear conversion efficiency is less than 100%, only a portion of the fundamental light beam 11 is frequency doubled, so that a second harmonic beam 14 at a second harmonic frequency $2\omega$ exits the second harmonic crystal 12 together with an unconverted portion 11A of the fundamental optical beam 11. The second harmonic beam 14 and the unconverted portion 11A of the fundamental optical beam 11 impinge on the third harmonic crystal 13, which converts a portion of these beams into a third harmonic beam 19 at a third harmonic frequency $3\omega$. Thus, three beams exit the third harmonic crystal 13: an unconverted portion 11B of the unconverted portion 11A of the fundamental optical beam 11, an unconverted portion 14A of the second harmonic beam 14, and the third harmonic beam 19. The dichroic mirror 15 redirects the fundamental 11B and second harmonic 14A beam portions, and transmits the third harmonic beam 19 as a desired output.

One drawback of the prior-art cascaded harmonic tripler 10 is that tight focusing of the fundamental 11A and second harmonic 14 beams into the third harmonic crystal 13 is typically required to obtain reasonable conversion efficiency. One drawback of tight focusing is that a small spot diameter of the fundamental 11A and second harmonic 14 beams may compromise beam quality due to a beam walk-off effect. Another drawback is that a UV-induced degradation of the third harmonic crystal 13 output surface may result after tens or hundreds of hours of exposure at UV peak power densities in the 200 MW/cm$^2$ range and average powers in the Watt range or more.

SUMMARY

In accordance with the disclosure, a relative disposition of individual harmonic crystals of a cascaded harmonic generator in an optical path of the fundamental optical beam may be reversed. For example, in a third harmonic generator, the fundamental optical beam may enter the third harmonic crystal first, and the second harmonic crystal second. When the fundamental optical beam enters the third harmonic crystal first, the fundamental light is not depleted by second harmonic generation process, which may increase the overall conversion efficiency, thereby allowing one to operate the harmonic generator at a larger beam size, thereby improving reliability.

In accordance with an aspect of the disclosure, there is provided a third harmonic generator comprising:

a first beam combiner for combining a first fundamental optical beam with a second harmonic optical beam;

a third harmonic crystal coupled to the first beam combiner, for generating a third harmonic optical beam from the first fundamental optical beam and the second harmonic optical beam, wherein upon generation of the third harmonic optical beam, a residual fundamental optical beam exits the third harmonic crystal;

a first beam splitter coupled to the third harmonic crystal, for separating the residual fundamental optical beam and the third harmonic optical beam; and a second harmonic crystal coupled to the first beam splitter, for generating the second harmonic optical beam from the residual fundamental optical beam, and for coupling the second harmonic optical beam to the first beam combiner.

In accordance with the disclosure, there is further provided a fourth harmonic generator comprising the above third harmonic generator and a second beam combiner for combining a second fundamental optical beam with the third harmonic optical beam generated by the third harmonic crystal;

a fourth harmonic crystal coupled to the second beam combiner, for generating a fourth harmonic optical beam from the second fundamental optical beam and the third harmonic optical beam, wherein upon generation of the fourth harmonic optical beam, the first fundamental optical beam exits the fourth harmonic crystal;

a second beam splitter coupled to the fourth harmonic crystal, for separating the first fundamental optical beam and the fourth harmonic optical beam and for coupling the first fundamental optical beam to the first beam combiner of the third harmonic generator.

In accordance with another aspect of the disclosure, there is further provided a cascaded harmonic generator for cascaded optical harmonic generation from a main optical beam, the cascaded harmonic generator comprising:

a higher harmonic generator disposed in a path of the main optical beam for generating a higher harmonic optical beam while transmitting a residual lower harmonic optical beam;

a lower harmonic generator disposed in the path of the main optical beam downstream of the higher harmonic generator, for generating a lower harmonic optical beam while transmitting a residual main optical beam;

a harmonic separator disposed in the path of the main optical beam between the higher and lower harmonic generators, for splitting the higher harmonic optical beam from the main optical beam propagated through the higher harmonic generator; and a harmonic combiner disposed in the path of the residual main optical beam downstream of the lower harmonic generator, for coupling the lower harmonic optical beam generated by the lower harmonic generator to the higher harmonic generator for generating the higher harmonic optical beam.

In one embodiment, the cascaded harmonic generator further comprises a pulsed light source for providing the main optical beam, wherein the main optical beam is pulsed at a pulse separation of substantially an integer multiple of a light round trip time in an optical loop comprising the lower and higher harmonic generators.

In accordance with another aspect of the disclosure, there is further provided a method of cascaded optical harmonic generation from a main optical beam, the method comprising:

propagating a main optical beam in sequence through a higher harmonic generator; and then through a lower harmonic generator, so as to generate a lower harmonic optical beam;

propagating the lower harmonic optical beam generated by the lower harmonic generator through the higher harmonic generator, such that the lower harmonic optical beam overlaps with the main optical beam in the higher harmonic generator, so as to generate the higher harmonic optical beam.

In accordance with another aspect of the disclosure, there is further provided a method of cascaded optical harmonic generation from a main optical beam, the method comprising:

providing a plurality of harmonic generators comprising one each of $m^{th}$ harmonic generators, wherein m=2, ..., M, and M≥3;

propagating the main optical beam through the plurality of harmonic generators in the order of decreasing number m, starting from the $M^{th}$ harmonic generator and ending with the second harmonic generator;

propagating each $n^{th}$ harmonic optical beam, wherein n=2 ... M−1, through the $(n+1)^{th}$ harmonic generator, so as to overlap therein with the main optical beam; and outputting the $M^{th}$ harmonic optical beam.

In one exemplary embodiment, the fundamental or main optical beam is directed so that it does not form a closed optical loop. For example, the fundamental or main optical beam may be directed to an optical beam dump before re-entering the highest-order harmonic generator for the second time.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 2:
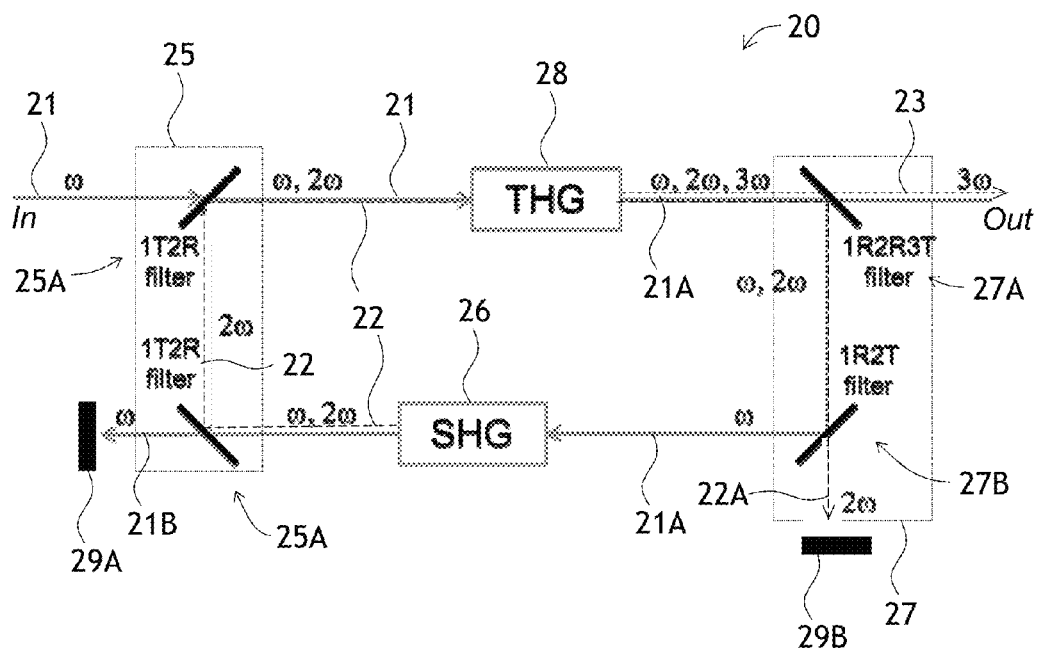
FIG. 2 illustrates a schematic block diagram of a cascaded third harmonic generator of the present disclosure.

Referring to FIG. 2, a third harmonic generator 20 may include: a second harmonic crystal 26 for generating a second harmonic optical beam, a third harmonic crystal 28 for generating a third harmonic optical beam, a first beam combiner 25, and a first beam splitter 27. The first beam combiner 25 may include two dichroic mirrors 25A. The dichroic mirrors 25A are denoted in FIG. 2 with "1T2R filter", which conveniently symbolizes transmitting ("T") a fundamental ("1") optical frequency $\omega$, and reflecting ("R") a doubled ("2") optical frequency $2\omega$. The first beam splitter 27 may include upper 27A and lower 27B dichroic mirrors. Similarly, the upper dichroic mirror 27A is denoted with "1R2R3T filter", which symbolizes reflecting ("R") the fundamental ("1") optical frequency $\omega$; reflecting ("R") the doubled ("2") optical frequency $2\omega$; and transmitting ("T") the tripled ("3") optical frequency $3\omega$. The lower dichroic mirror 27B is denoted with "1R2T filter", which symbolizes reflecting ("R") the fundamental ("1") optical frequency $\omega$, and transmitting ("T") the doubled ("2") optical frequency $2\omega$. The above mirror notation will be followed throughout the rest of the specification and drawings.

In the first beam combiner 25, two identical dichroic mirrors 25A—upper and lower dichroic mirrors 25A—may be used for combining a first fundamental optical beam 21 at the fundamental optical frequency $\omega$ with a second harmonic optical beam 22 at the doubled optical frequency $2\omega$. The third harmonic crystal 28 may be coupled to the upper dichroic mirror 25A of the first beam combiner 25 for generating a third harmonic optical beam 23 at the tripled optical frequency $3\omega$ from the first fundamental optical beam 21 at the fundamental optical frequency $\omega$ and the second harmonic optical beam 22 at the doubled optical frequency $2\omega$. Upon generation of the third harmonic optical beam 23 at the tripled optical frequency $3\omega$, a residual fundamental optical beam 21A at the fundamental optical frequency $\omega$ may exit the third harmonic crystal 28, and be directed, via the upper filter 27A of the first beam splitter 27, to the lower filter 27B of the first beam splitter 27 and further through the second harmonic crystal 26, where the residual fundamental optical beam 21A may be used to generate the second harmonic optical beam 22. A residual beam 21B of the residual fundamental optical beam 21A is directed through the lower dichroic mirror 25A of the first beam combiner 25, where it may be absorbed by an optional optical beam dump 29A (bottom left of FIG. 2). A residual second harmonic beam 22A from the third harmonic crystal 28 at the doubled optical frequency $2\omega$ may be reflected by the upper dichroic mirror 27A to propagate through the lower dichroic mirror 27B to another optional optical beam dump 29B (bottom right of FIG. 2). The second harmonic optical beam 22, to the left of the second harmonic crystal 26, is coupled to the first beam combiner 25 which, as noted at the beginning of this paragraph, may be used for combining the first fundamental optical beam 21 with the second harmonic optical beam 22 for generating the third harmonic optical beam 23.

Figure 3A:
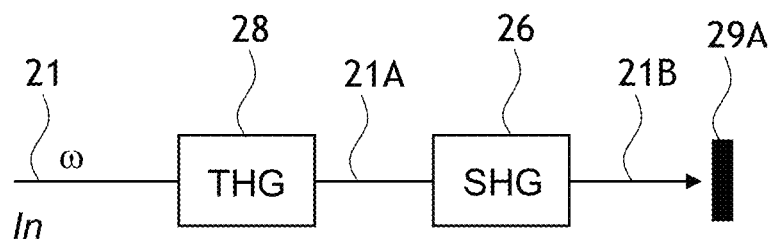
FIGS. 3A to 3C illustrate optical paths of a fundamental optical beam (FIG. 3A); a second harmonic beam (FIG. 3B); and a third harmonic beam (FIG. 3C) of the cascaded harmonic generator of FIG. 2.
Figure 3B:
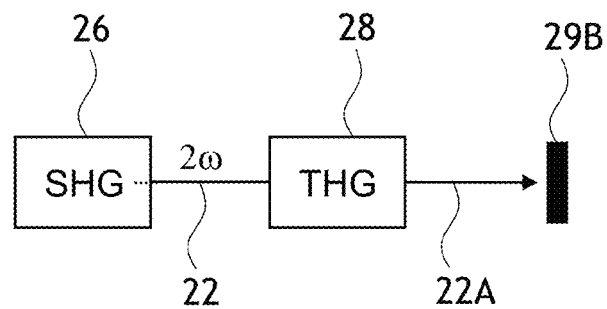
Figure 3C:
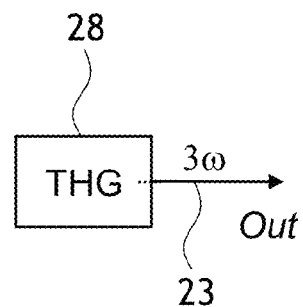

The optical paths of the first fundamental optical beam 21 at the fundamental optical frequency ω, the second harmonic optical beam 22 at the doubled optical frequency 2ω, and the third harmonic optical beam 23 at the tripled optical frequency 3ω may be easier tracked by referring to FIGS. 3A-3C. In FIG. 3A, the first fundamental optical beam 21 at the fundamental optical frequency ω propagates in sequence through the third harmonic crystal 28, then the second harmonic crystal 26 as the residual fundamental optical beam 21A, and then is directed to the left optical beam dump 29A as the residual beam 21B of the residual fundamental optical beam 21A. In FIG. 3B, the second harmonic optical beam 22 at the doubled optical frequency 2ω is generated in the second harmonic crystal 26, propagates through the third harmonic crystal 28, and is directed to the right optical beam dump 29B as the residual second harmonic optical beam 22A. In FIG. 3C, the third harmonic optical beam 23 is generated in the third harmonic crystal 28, and is directed to the output of the third harmonic generator 20.

Figure 1:
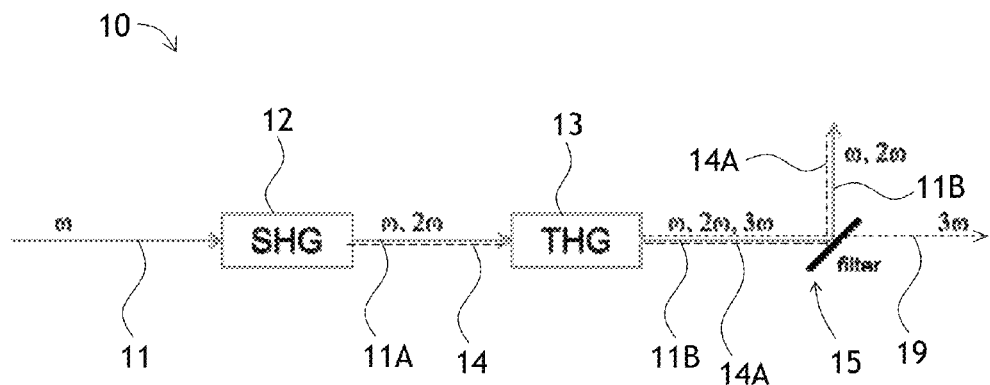
FIG. 1 illustrates a schematic block diagram of a prior-art cascaded harmonic tripler.

Fundamentally, the above-described process may provide a higher efficiency conversion than the prior-art frequency tripler 10 of FIG. 1, at least for the following reason. The third harmonic conversion efficiency depends approximately on the product of the input power densities at the fundamental optical frequency ω and at the doubled optical frequency 2ω. In the prior-art frequency tripler 10 of FIG. 1, the total power input to the third harmonic crystal 13 is limited to the total power input P to the third harmonic generator, because the second harmonic crystal 12 converts some of the input power P at ω to 2ω, but the total power remains substantially unchanged. Typically, the optimal conversion of ω and 2ω into 3ω may occur when the power at ω is about 0.4 P and that at 2ω is about 0.6 P, and the product is 0.24 $P^2$. In the third harmonic generator 20 of FIG. 2, the input at the third harmonic crystal 28 consists of 1.0 P at ω and typically about 0.6 P at 2ω, so that the product can be about 0.6 $P^2$, which is 2.5 times higher than in the prior-art third harmonic tripler 10. The total optical power input to the third harmonic crystal 28 is actually greater than P, because much of the power at ω may be used twice: first, in the THG process; and second, in the SHG process. The result is that the power density—and, therefore, the conversion efficiency—may be much higher than in the prior-art third harmonic tripler 10.

Referring momentarily back to FIGS. 3A-3C, the residual fundamental optical beam 21B may be prevented from re-entering the third harmonic crystal 28, for example by using the lower dichroic mirror 25A or by some other suitable filter, to avoid potential optical interference effects. Similarly, the residual second harmonic optical beam 22A may be prevented from re-entering the second harmonic crystal 26, for example by using the lower filter 27B of by some other suitable filter. In other words, the optical paths of the fundamental 21 and second harmonic 22 optical beams may be configured so as not to form a closed loop, i.e. an open loop, at individual optical frequencies, or an optical cavity at an individual optical frequency. Avoiding the closed loop or the optical cavity at individual optical frequencies may facilitate stability of the second and third harmonic generation processes.

The second 26 and third 28 harmonic crystals may include different materials depending on wavelength, power level, or other parameters. Phase matching for SHG and THG may be of many varieties: Type I or Type II, critical or noncritical, collinear or non-collinear. Quasi-phase matching, e.g. using periodically-poled materials, may also be an option. Various kinds of mirrors or optical filters may be used to separate or combine the beams 21, 22, and 23: dichroic or trichroic thin-film filters, polarization filters, absorptive filters, prisms, gratings, or other filters or mirrors known to a person skilled in the art. Various orderings and combinations of filters, crystals, mirrors, etc. may be used. Waveplates, non-planar beam paths, or lenses may be included at appropriate locations to provide the desired polarization state or beam size or profile depending on specifics of the conversion configuration. Anti-reflective coatings or Brewster-angle surfaces may be implemented on the second 26 and third 28 harmonic crystals to reduce power loss due to surface reflections.

One attractive feature of the third harmonic generator 20 of FIG. 2 is that, since the first fundamental optical beam 21 at the fundamental optical frequency ω and the second harmonic optical beam 22 at the doubled optical frequency 2ω are launched separately into the third harmonic crystal 28, the position and angle of the beams 21 and 22 can be optimized for a specific conversion configuration by simple adjustment of the individual dichroic mirrors 25A. Thus, for example, a birefringent or dispersive walk-off plate may not be needed for walk-off compensation. Similarly, for non-collinear phase matching, no prism or other dispersive element may be needed to create a desired angle between the first fundamental optical beam 21 at the fundamental optical frequency ω and the second harmonic optical beam 22 at the doubled optical frequency 2ω.

Because of the time required for light to travel around a loop formed by the dichroic mirrors 25A, 27A, and 27B and including the second 26 and third 28 harmonic crystals (FIG. 2), the second harmonic optical beam 22 arrives at the third harmonic crystal 28 delayed with respect to the first fundamental optical beam 21. Thus, in general, this configuration may be adaptable for operation with input pulses that are longer in duration than the time required for light to travel around the loop. The typical minimum dimension of such a loop, including second 26 and third 28 harmonic crystals, would be several centimeters, for example 3 cm, corresponding to a minimum useful pulse duration on the order of 100 picoseconds. Thus, the reversed-order harmonic conversion technique described above may be well suited for laser systems generating nanosecond or longer pulses, for example Q-switched solid-state lasers, as well as continuous wave (CW) lasers. Smaller loops addressing picosecond pulses, e.g. from mode-locked lasers, may be built using micro-optics of millimeter or smaller size.

The configuration of the third harmonic generator 20 of FIG. 2 may also be used with multiple pulses, each of which is shorter than the loop round-trip time, if the loop round-trip time is selected to be approximately equal to the pulse separation time, or a multiple of it. In the latter case, the input to the third harmonic crystal 28 includes a new IR pulse and a second harmonic pulse that was generated from an earlier IR pulse. For example, a CW mode-locked laser may continuously deliver pulses of duration about 10 picoseconds or shorter at repetition rates in the range of tens of 1 MHz to 1 GHz. With a 200 MHz mode-locked laser, for example, a reversed-order third harmonic generator, similar to the third harmonic generator 20, with a loop of round-trip time of 5 nanoseconds, corresponding to 150 cm total optical path length, would allow each pulse to be tripled using SHG light from the preceding pulse. This configuration would provide the same benefits of improved conversion efficiency as in the case of a single longer pulse. Even for a pulse burst consisting only of two pulses, there are benefits, since two input pulses are effectively being combined into one THG pulse, a greater output peak power may be generated for a given peak input power.

Figure 4:
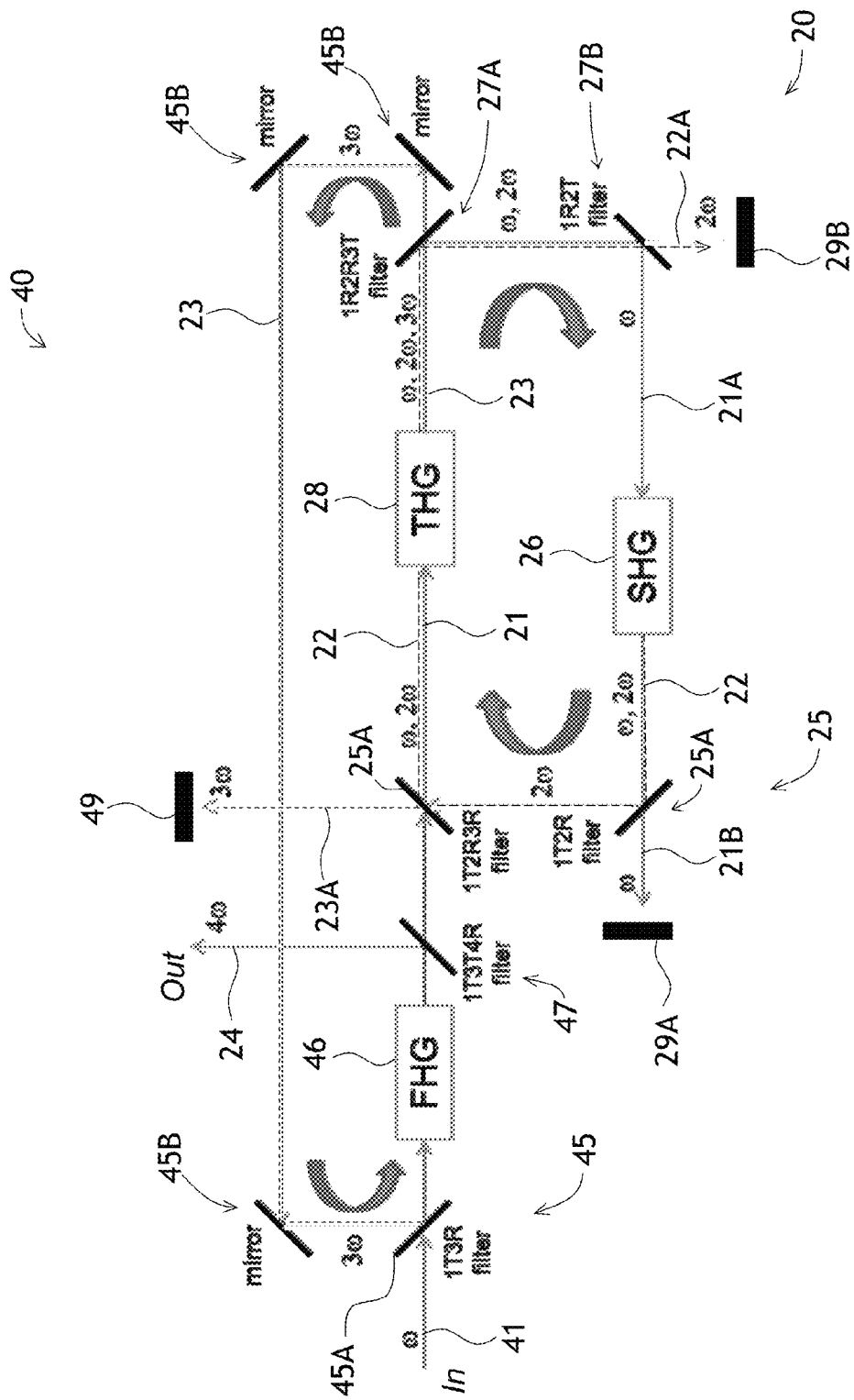
FIG. 4 illustrates a schematic block diagram of a cascaded fourth harmonic generator of the present disclosure, incorporating the cascaded third harmonic generator of FIG. 2.

Referring now to FIG. 4 with further reference to FIG. 2, a fourth harmonic generator 40 may include the third harmonic generator 20 of FIG. 2. A second beam combiner 45, including a dichroic mirror 45A and three turning mirrors 45B, may be provided for combining a second fundamental optical beam 41 with the third harmonic optical beam 23 generated by the third harmonic crystal 28. A fourth harmonic crystal 46 ("FHG", fourth harmonic generation) may be coupled to the second beam combiner 45, for generating a fourth harmonic optical beam 24 at quadrupled optical frequency 4ω from the second fundamental optical beam 41 and the third harmonic optical beam 23. Upon generation of the fourth harmonic optical beam 24, the first fundamental optical beam 21 exits the fourth harmonic crystal 46, and a residual beam 23A of the third harmonic optical beam 23 exits the fourth harmonic crystal 46 and may be directed to a top optical beam dump 49 by the upper dichroic mirror 25A, or another suitable splitter. Essentially, in this embodiment the first fundamental optical beam 21 is a residual fundamental optical beam of the second fundamental optical beam 41. Just like in the third harmonic generator 20 of FIG. 2, the first fundamental optical beam 21 is used in the fourth harmonic generator 40 for generating the third harmonic optical beam 23 and the second harmonic optical beam 22. A second harmonic splitter (1T3T4R dichroic mirror) 47 may be coupled to the fourth harmonic crystal 46, for separating the first fundamental optical beam 21 from the fourth harmonic optical beam 24, and for coupling the first fundamental optical beam 21 to the first beam combiner 25 of the third harmonic generator 20.

Figure 5A:
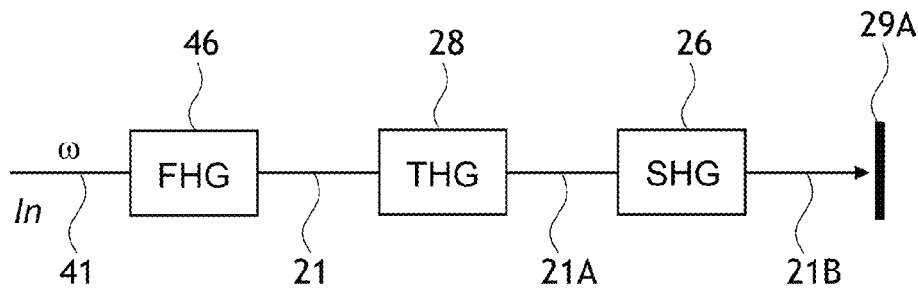
FIGS. 5A to 5D illustrate optical paths of a fundamental optical beam (FIG. 5A); a second harmonic beam (FIG. 5B); a third harmonic beam (FIG. 5C); and a fourth harmonic beam (FIG. 5D) of the cascaded harmonic generator of FIG. 4.
Figure 5B:
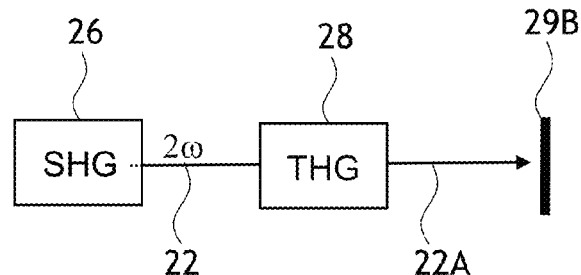
Figure 5C:
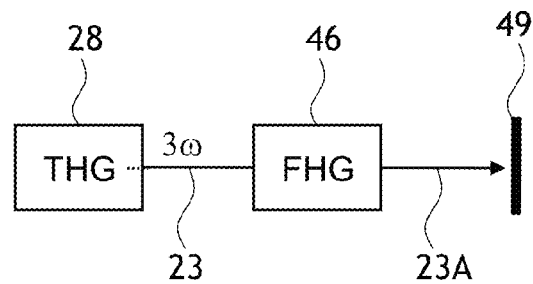
Figure 5D:
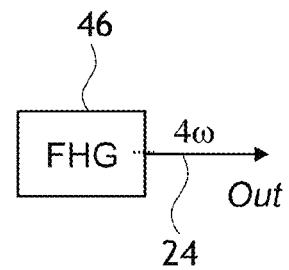

The optical paths of the first 21 and second 41 fundamental optical beams, the second harmonic optical beam 22, and the third harmonic optical beam 23 may be easier traced by referring to FIGS. 5A-5D. In FIG. 5A, the second fundamental optical beam 41 propagates through the fourth harmonic crystal 46. The first fundamental optical beam 21, which is the residual fundamental beam of the second fundamental optical beam 41 as explained above, propagates in sequence through the third harmonic crystal 28, the second harmonic crystal 26 as the residual fundamental optical beam 21A, and may be directed to the left optical beam dump 29A as the residual beam 21B of the residual fundamental optical beam 21A. In FIG. 5B, the second harmonic optical beam 22 is generated in the second harmonic crystal 26, propagates through the third harmonic crystal 28, and is directed to the right optical beam dump 29B as the residual second harmonic optical beam 22A. In FIG. 5C, the third harmonic optical beam 23 is generated in the third harmonic crystal 28, and is directed to the fourth harmonic crystal 46, and is then directed to the top optical beam dump 49 as the residual third harmonic optical beam 23A. Finally, in FIG. 5D, the fourth harmonic beam 24 is generated and is directed to the output of the fourth harmonic generator 40.

Figure 6:
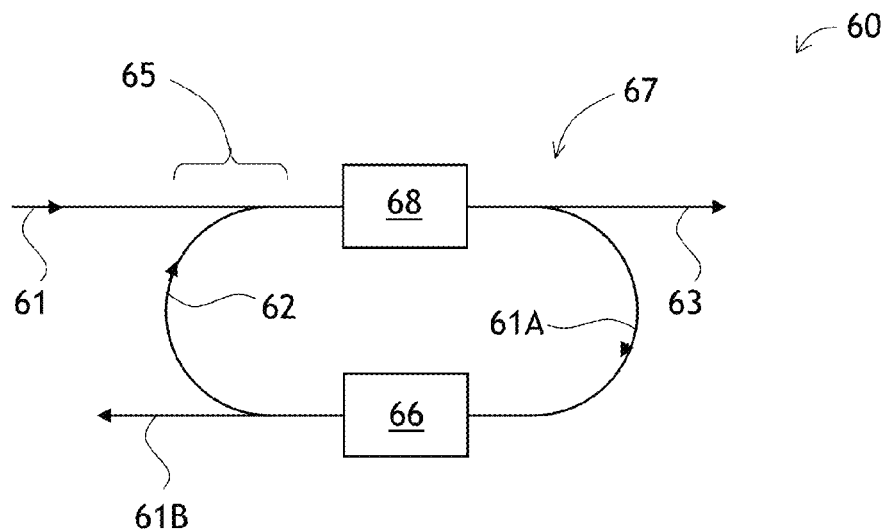
FIG. 6 illustrates a schematic block diagram of a cascaded harmonic generator.

Similar cascaded configurations incorporating one or more reversed-order stages can be implemented for fifth-harmonic generation and beyond. Turning to FIG. 6 with further reference to FIGS. 2 and 4, a cascaded harmonic generator 60 (FIG. 6) for cascaded optical harmonic generation from a main optical beam 61, e.g. the first fundamental optical beam 21 (FIG. 2) or the second fundamental optical beam 41 (FIG. 4), may include a "higher harmonic generator" 68 disposed in a path of the main optical beam 61 for generating a "higher harmonic optical beam" 63. A "lower harmonic generator" 66 may be disposed in the path of the main optical beam 61, that is, in a path of a residual main optical beam 61A, downstream of the higher harmonic generator 68, for generating a "lower harmonic optical beam" 62 from the residual main optical beam 61A. The "higher"68 and "lower" 66 harmonic generators may be, for example, the third 28 and second 26 harmonic crystals, respectively, in the third harmonic generator 20 of FIG. 2. Another example may include the fourth harmonic crystal 46 of the fourth harmonic generator 40 of FIG. 4 as the "higher harmonic generator" 68, and the entire third harmonic generator 20 as the "lower harmonic generator" 66.

A harmonic separator 67 may be disposed in the path of the main optical beam 61 between the higher 68 and lower 66 harmonic generators, for splitting the higher harmonic optical beam 63 from the residual main optical beam 61A propagated through the higher harmonic generator 68. A harmonic combiner 65 may be disposed in the path of a residual beam 61B of the residual main optical beam 61A downstream of the lower harmonic generator 66, for coupling the lower harmonic optical beam 62 generated by the lower harmonic generator 66, and the main optical beam 61, to the higher harmonic generator 68 for generating the higher harmonic optical beam 63, while optionally disposing of the residual beam 61B, as shown in FIG. 6. Thus, the beam combiners 25, 45 and/or the harmonic splitter 47 may be configured so that a path of the main optical beam 61 or the lower harmonic optical beam 62 in the cascaded harmonic generator 60 is absent an optical closed loop, to avoid instability due to positive optical feedback.

Figure 7:
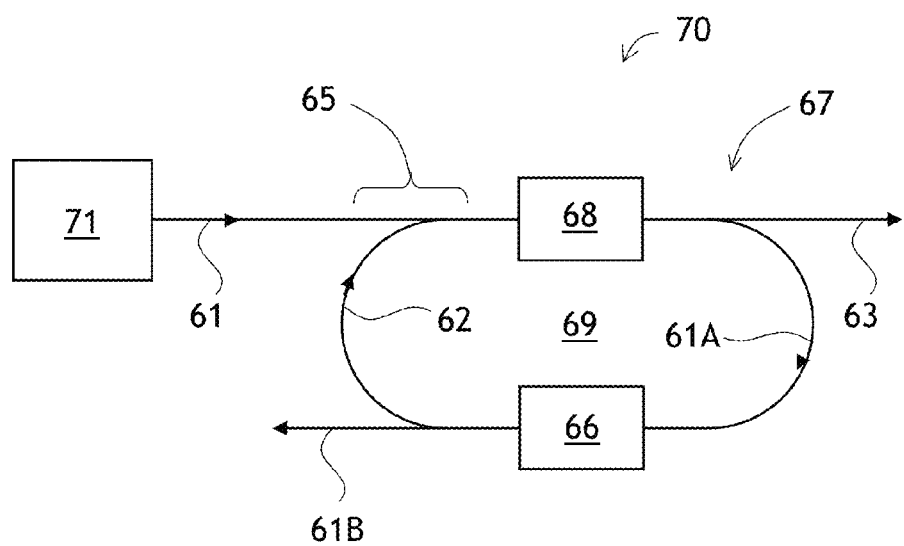
FIG. 7 illustrates a schematic block diagram of the cascaded harmonic generator of FIG. 6, including a pulsed source of fundamental light.

Referring now to FIG. 7 with further reference to FIG. 6, a cascaded harmonic generator 70 includes the cascaded harmonic generator 60 of FIG. 6 and a pulsed light source 71 for providing the main optical beam 61. Similarly to the case of the third harmonic generator 20 of FIG. 2, the main optical beam 61 of the cascaded harmonic generator 60 may be pulsed at a pulse separation of substantially an integer multiple of a light round trip time in an optical loop 69 including the lower 66 and higher 68 harmonic generators.

Figure 8:
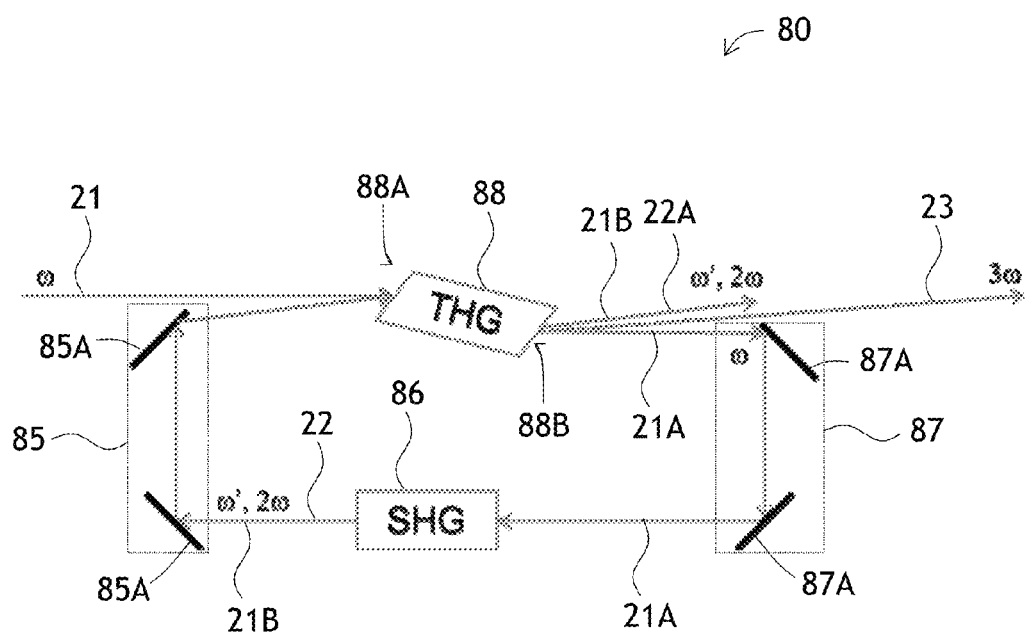
FIG. 8 illustrates a schematic block diagram of an embodiment of a cascaded third harmonic generator using a slanted third harmonic crystal.

Turning now to FIG. 8 with further reference to FIGS. 2 and 6, a third harmonic generator 80 is a variant of the third harmonic generator 20 of FIG. 2, and may be viewed as an example of the cascaded harmonic generator 60 of FIG. 6. The third harmonic generator 80 of FIG. 8 may include a second harmonic crystal 86 as the lower harmonic generator 66, and a third harmonic crystal 88 as the higher harmonic generator 68. One distinct feature of the third harmonic generator 80 of FIG. 8 is that the third harmonic crystal 88 may include input 88A and output 88B optical faces slanted relative to the input of the fundamental optical beam 21, preferably at Brewster angle. Another feature is that a first beam combiner 85 may include upper and lower turning mirrors 85A, and a first beam splitter 87 may include upper and lower turning mirrors 87A. The upper and lower turning mirrors 85A, 87A do not have to be dichroic mirrors, that is, the upper and lower turning mirrors 85A, 87A may be regular mirrors, where beam combining and splitting functions are provided by spatial multiplexing, i.e. one beam is reflected by the mirror whereas a second beam bypasses the mirror spatially. Alternatively, the beam combining and splitting function can be provided by polarization multiplexing, where the beams are of differing polarizations, and the mirror transmits one polarization and reflects the other.

The third harmonic crystal 88 is preferably oriented such that the first fundamental optical beam 21 and the second harmonic optical beam 22 impinge on the input optical face 88A of the third harmonic crystal 88 at a non-normal (acute) angle of incidence. Furthermore, the first fundamental optical beam 21 and the second harmonic optical beam 22 may form a nonzero (acute) angle with respect to each other. The first fundamental optical beam 21 may be polarized in the plane of FIG. 8. The SHG in the second harmonic crystal 26 may be Type I, generating the second harmonic optical beam 22 at the doubled frequency 2ω polarized perpendicular to FIG. 8. The THG in the third harmonic crystal 88 may be Type II, combining the first fundamental optical beam 21 polarized in the plane and the second harmonic optical beam 22 polarized perpendicular to the plane of FIG. 8, to generate the third harmonic optical beam 23 at the tripled frequency 3ω polarized in the plane of FIG. 8.

For micrometer wavelength range and a peak input power of greater than about 1 kW, the second harmonic crystal 86 (FIG. 8) may be lithium barium borate (LBO) with preferably non-critical phase matching at about 150° C., and the third harmonic crystal 88 (FIG. 8) may be LBO with critical and either collinear or non-collinear phase matching polarized perpendicular to FIG. 8. Because the third harmonic crystal 88 has Brewster angles of incidence and exit, spectral dispersion, that is, wavelength dependence of refractive index, of the third harmonic crystal 88 may provide an angular separation of the optical beams at the input 88A and output 88B faces of the third harmonic crystal 88.

One benefit of this configuration is that no waveplates or dichroic mirrors may be required to separate residual output beams 21B and 22A from third harmonic optical beam 23, and to rotate polarization. Indeed, the upper turning mirror 85A of the first beam combiner 85 may couple the second harmonic optical beam 22 and the residual optical beam 21B to the third harmonic crystal 88. The upper turning mirror 87A of the first beam splitter 87A may split off the residual fundamental optical beam 21A. When the first fundamental optical beam 21 and the second harmonic optical beam 22 have different angles of incidence on the input face 88A of the third harmonic crystal 88, the first fundamental optical beam 21 and the second harmonic optical beam 22 may be substantially collinear within the third harmonic crystal 88. In the example of Type II LBO THG length in the 1 mm range, the angular separation of the beams 21 and 22 is on the order of 1°-3°, which may suffice for straightforward beam separation using mirror edges or beam blocks. The use of Brewster surfaces may be beneficial, because no anti-reflection (AR) coating may be needed on the output face 88B of the third harmonic crystal 88, as both the residual fundamental optical beam 21A and the third harmonic optical beam 23 are p-polarized for low-loss Brewster transmission. Together with the increased surface area of the faces 88A, 88B relative to a normal-incidence face, this significantly improves the UV-damage resistance of the faces 88A, 88B. The input face 88A may preferably be AR-coated for s-polarized second harmonic beam 22 and p-polarized first fundamental optical beam 21. Another benefit of this configuration is that the residual beam 21B at the fundamental frequency ω, needs not be immediately dumped, as it will be collinear with the second harmonic beam 22 and, therefore, not collinear with the first fundamental optical beam 21 within the third harmonic crystal 88, so it will likely not interfere with the THG process and will exit collinearly with the residual second harmonic beam 22A, whereupon both can be separated from the third harmonic optical beam 23 and ejected in one common optical beam dump, not shown. As in FIG. 2, lenses or other optics may be added to generate appropriate beam sizes and spatial profiles at the crystals.

Figure 9A:
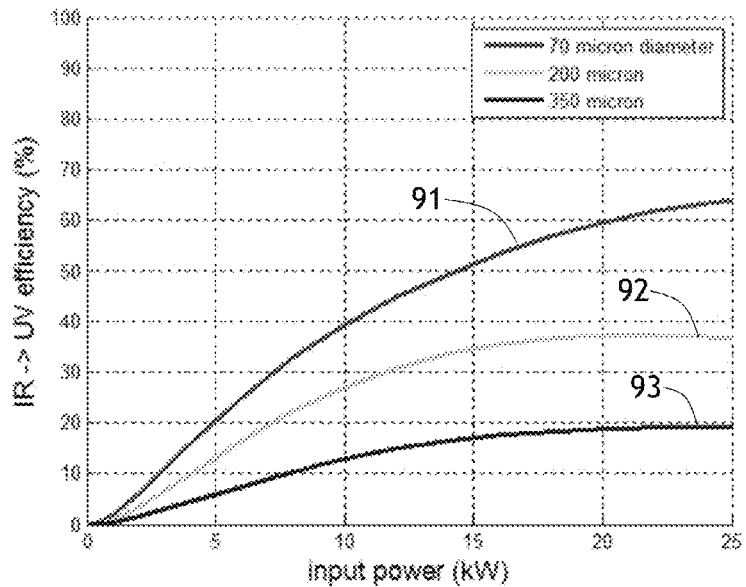
FIG. 9A illustrates a computed conversion efficiency diagram of the frequency tripler of FIG. 1.
Figure 9B:
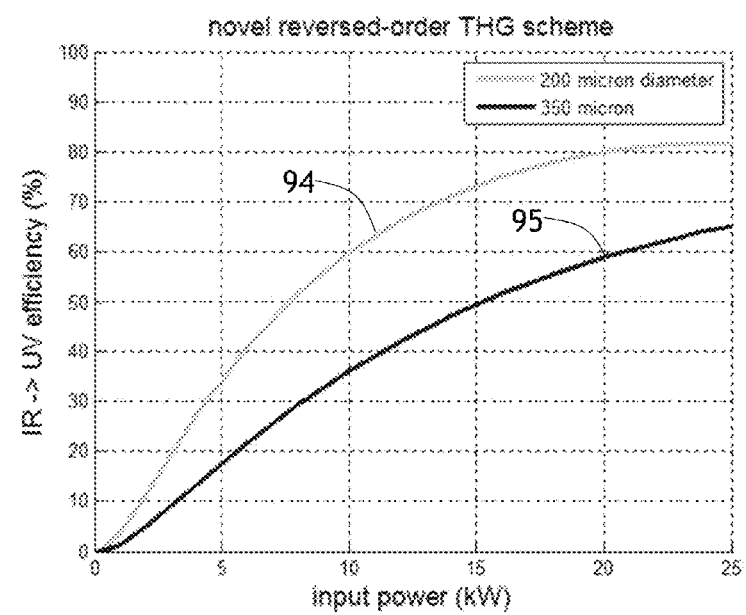
FIG. 9B illustrates a computed conversion efficiency diagram of the third harmonic cascaded generator of FIG. 2, for comparison with FIG. 9A.

Referring to FIGS. 9A and 9B with further reference to FIGS. 1 and 2, calculated optical conversion efficiency of the third harmonic generator 20 FIG. 2 (FIG. 9B) is compared to that of the conventional optical frequency tripler 10 of FIG. 1 (FIG. 9A). In both FIGS. 9A and 9B, the optical conversion efficiency is plotted as a function of input optical power in kW, up to 25 kW input optical power level.

Referring specifically to FIG. 9A with further reference to FIG. 1, the optical conversion efficiency is plotted for 70 micrometer second harmonic beam 14 diameter (91); 200 micrometer second harmonic beam 14 diameter (92); and 350 micrometer second harmonic beam 14 diameter (93). The input wavelength is 1064 nm, and the pulse durations are typically tens of nanoseconds. Both SHG 12 and THG 13 crystals are LBO. The second harmonic crystal 12 is 15 mm long, with Type I non-critical phase matching at about 150° C. with a 140 micrometer diameter spot of the fundamental beam 11. The third harmonic crystal 13 is 20 mm long, and the phase matching is Type II critical, non-collinear phase matching. A highest conversion efficiency 91 corresponds to the spot diameter of the second harmonic beam 14 of 70 micrometer, which may provide the best conversion at 20 kW input power. Middle 92 and bottom 93 conversion efficiencies correspond to the spot diameters of the second harmonic beam 14 of 200 micrometer and 350 micrometer, respectively. These spot diameters result in the efficiencies 92 and 93, which are traded off for larger spot size and therefore improved beam quality and crystals 12 and 13 lifetime. At 25 kW input power level to the prior-art frequency tripler 10, the 70 micrometer input spot size results in 63% conversion efficiency 91; the 200 micrometer spot size results in 37% conversion efficiency 92; and the 350 micrometer spot size results in just below 20% conversion efficiency 93.

Turning now specifically to FIG. 9B with further reference to FIG. 2, a highest optical conversion efficiency 94 corresponds to 200 micrometer beam diameter of the second harmonic beam 22 in the optical harmonic generator 20 of FIG. 2. A second highest conversion efficiency 95 corresponds to and 350 micrometer beam diameter of the second harmonic beam 22 in the optical harmonic generator 20 of FIG. 2.

The comparison of FIGS. 9A and 9B reveals a much higher conversion efficiency of the optical harmonic generator 20 of FIG. 2, as compared with the prior-art optical frequency tripler 10 of FIG. 1. For instance, at 25 kW input power level to the third harmonic generator 20 of FIG. 2, the 200 micrometer spot size results in 81% conversion efficiency; and the 350 micrometer spot size results in 65% conversion efficiency. Therefore, the third harmonic generator 20 of the present disclosure may provide a higher conversion efficiency at 200 micrometer second harmonic beam 22 diameter than the traditional frequency tripler 10 at 70 micrometer second harmonic beam 14 diameter.

Figure 10:
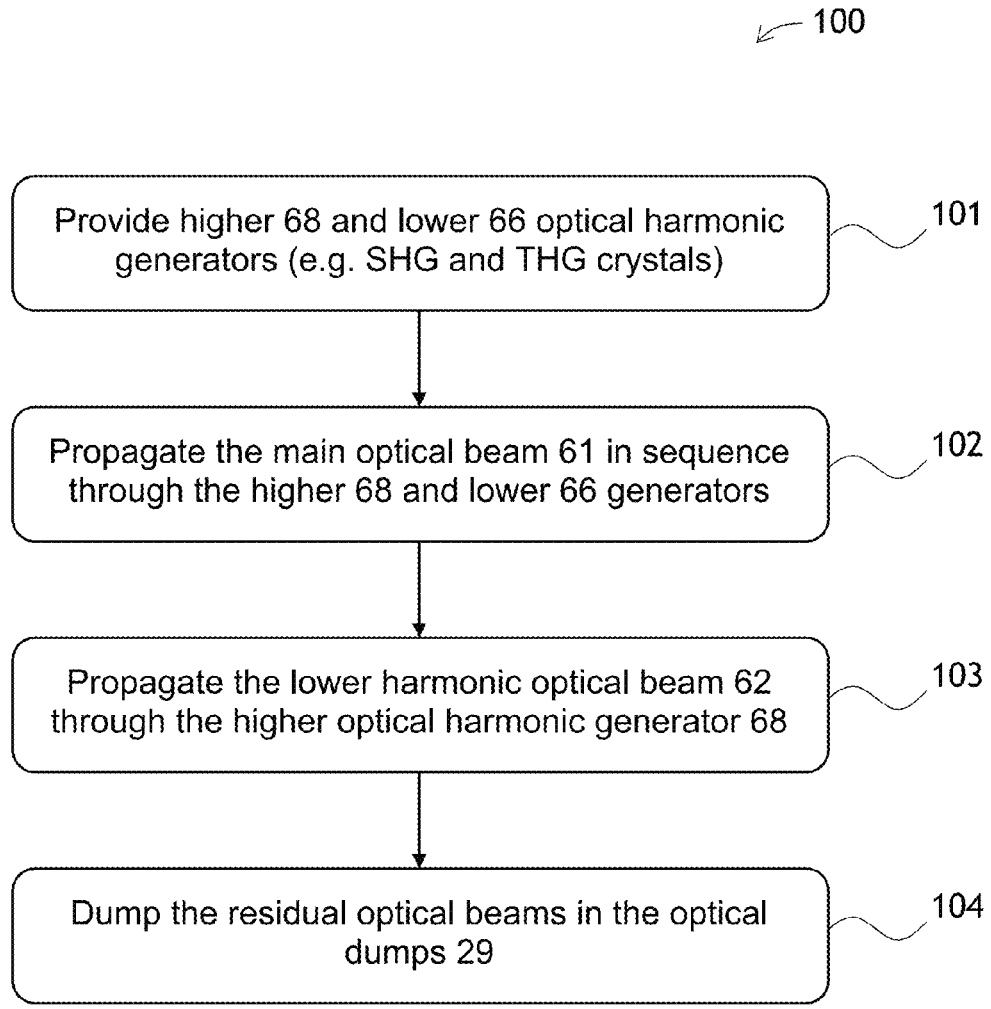
FIGS. 10 and 11 illustrate flow charts of embodiments of a method of cascaded optical harmonic generation according to the present disclosure.

Referring to FIG. 10 with further reference to FIGS. 2 and 6, a method 100 (FIG. 10) of cascaded optical harmonic generation from the main optical beam 61 (FIG. 6) may include a step 101 of providing the lower optical harmonic generator 66 for generating the lower harmonic optical beam 62, and the higher optical harmonic generator 68 for generating the higher harmonic optical beam 63. In a next step 102, the main optical beam 61 may be propagated in sequence through the higher harmonic generator 68; and then through the lower harmonic generator 66, so as to generate the lower harmonic optical beam 62 by propagating through the lower harmonic generator 66, such that the lower harmonic optical beam 62 overlaps with the main optical beam 61 in the lower harmonic generator 66. In a next step 103, the lower harmonic optical beam 62 generated by the lower harmonic generator 66 is propagated through the higher harmonic generator 68, such that the lower harmonic optical beam 62 overlaps with the main optical beam 61 in the higher harmonic generator 68, so as to generate the higher harmonic optical beam 63. Further, in an optional step 104, the residual main optical beam 62A exiting the lower harmonic generator 66, and/or other residual beams, may be separated from the lower harmonic optical beam and dumped in the optical dumps 29A, 29B.

Similarly to the optical harmonic generator 80 of FIG. 8, the lower harmonic optical beam 62 impinging on the higher harmonic generator 68 may form an acute angle with the main optical beam 61 impinging on the higher harmonic generator 68, for collinear propagation in the higher harmonic generator 68. Furthermore, the main optical beam may be pulsed at a pulse separation of substantially an integer multiple of the light round trip time in the optical loop 69 comprising the lower 66 and higher 68 harmonic generators.

Figure 11:
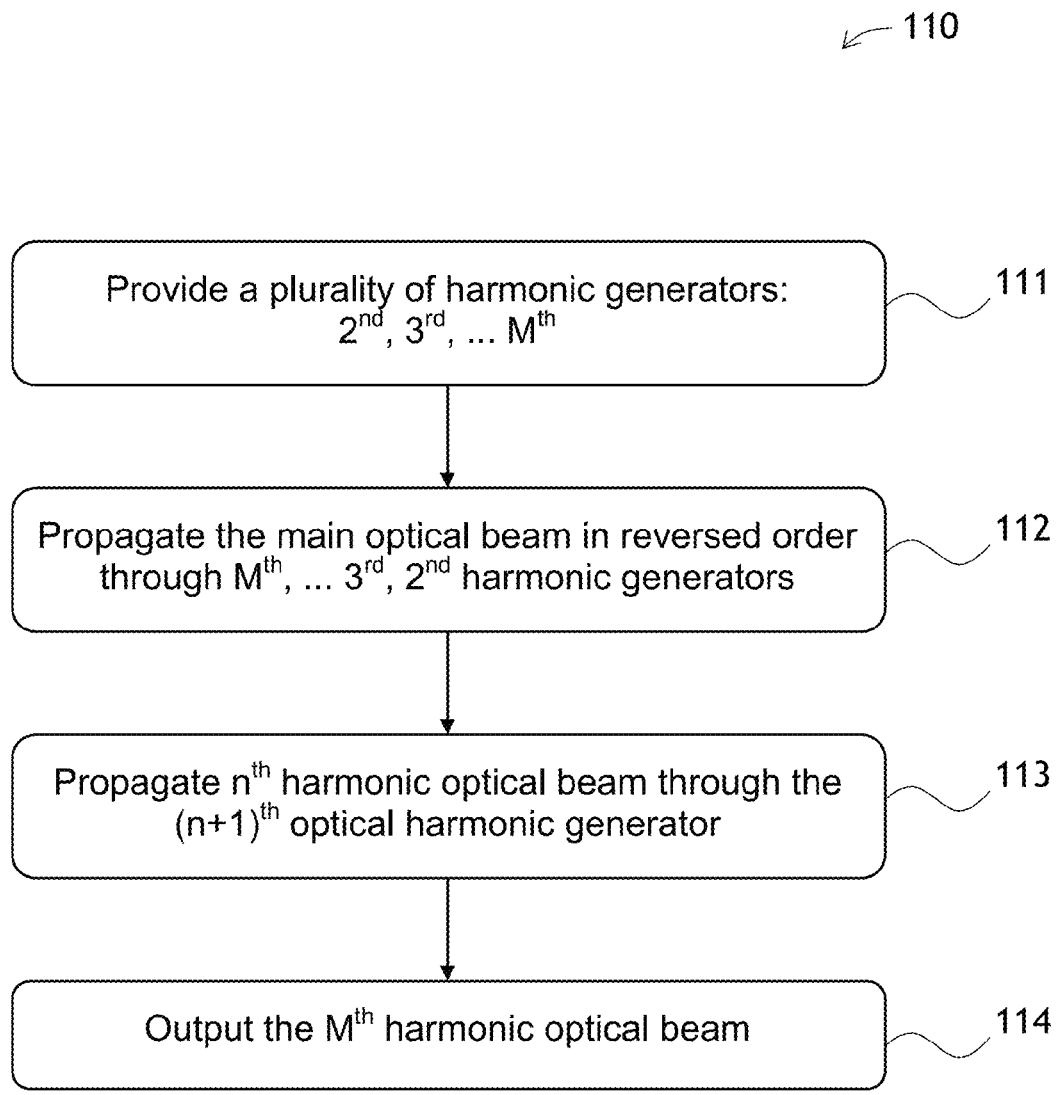

The method 100 of FIG. 10 may be generalized for higher order cascaded higher harmonic generation, for example the fourth harmonic (FIG. 4), fifth harmonic generation, and so on. Turning to FIG. 11, a method 110 of cascaded optical harmonic generation from a main optical beam includes a step 111 of providing a plurality of harmonic generators including at least one $m^{th}$ harmonic generator, where m=2, ..., M, and M is an integer ≥3. In a next step 112, the main optical beam may be propagated through the plurality of harmonic generators in the order of decreasing number m, starting from the $M^{th}$ harmonic generator and ending with the second harmonic generator. By way of illustration, referring momentarily back to FIG. 5A, the fourth harmonic optical beam 41 is propagated through the fourth harmonic crystal 46, the third harmonic crystal 28, and the second harmonic crystal 26.

In a next step 113, each $n^{th}$ harmonic optical beam may be propagated through the $(n+1)^{th}$ harmonic generator, so as to overlap therein with the main optical beam, where n=2, ..., M−1. For example, referring back to FIGS. 5B and 5C, the second harmonic optical beam 22 is propagated through the third harmonic crystal 28 (FIG. 5B), and the third harmonic optical beam 23 is propagated through the fourth harmonic crystal 46 (FIG. 5C). Finally, in a step 114, the $M^{th}$ harmonic optical beam is outputted. By way of example, referring back to FIG. 5D, the fourth harmonic beam 24 may be outputted from the fourth harmonic crystal 46. In one embodiment, the main optical beam is propagated so that an optical path of the main optical beam does not form a closed optical loop, i.e. it is open looped.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A third harmonic generator comprising:
    a first beam combiner configured to combine a first fundamental optical beam with a second harmonic optical beam;
    a third harmonic crystal coupled to the first beam combiner, configured to generate a third harmonic optical beam from the first fundamental optical beam and the second harmonic optical beam, wherein upon generation of the third harmonic optical beam, a residual fundamental optical beam exits the third harmonic crystal;
    a first beam splitter coupled to the third harmonic crystal, configured to separate the residual fundamental optical beam and the third harmonic optical beam; and
    a second harmonic crystal coupled to the first beam splitter, configured to generate the second harmonic optical beam from the residual fundamental optical beam, and for coupling the second harmonic optical beam to the first beam combiner.

2. The third harmonic generator of claim 1, wherein at least one of the first beam combiner and the first beam splitter comprises a mirror or a polarizer.

3. The third harmonic generator of claim 2, wherein the mirror comprises a dichroic mirror.

4. The third harmonic generator of claim 1, wherein the third harmonic crystal is configured and oriented for the first fundamental optical beam and the second harmonic optical beam to impinge on the third harmonic crystal at a non-normal angle of incidence.

5. The third harmonic generator of claim 4, wherein the first beam combiner is configured so as to prevent the residual fundamental optical beam from propagating in the third harmonic crystal collinear with the first fundamental optical beam.

6. The third harmonic generator of claim 4, wherein the second harmonic crystal is configured for Type I harmonic generation, and the third harmonic crystal is configured for Type II harmonic generation.

7. A fourth harmonic generator comprising:
    a third harmonic generator comprising:
    a first beam combiner configured to combine a first fundamental optical beam with a second harmonic optical beam;
    a third harmonic crystal coupled to the first beam combiner, configured to generate a third harmonic optical beam from the first fundamental optical beam and the second harmonic optical beam, wherein upon generation of the third harmonic optical beam, a residual fundamental optical beam exits the third harmonic crystal;
    a first beam splitter coupled to the third harmonic crystal, configured to separate the residual fundamental optical beam and the third harmonic optical beam; and
    a second harmonic crystal coupled to the first beam splitter, configured to generate the second harmonic optical beam from the residual fundamental optical beam, and for coupling the second harmonic optical beam to the first beam combiner;
    a second beam combiner configured to combine a second fundamental optical beam with the third harmonic optical beam generated by the third harmonic crystal;
    a fourth harmonic crystal coupled to the second beam combiner, configured to generate a fourth harmonic optical beam from the second fundamental optical beam and the third harmonic optical beam, wherein upon generation of the fourth harmonic optical beam, the first fundamental optical beam exits the fourth harmonic crystal; and
    a second beam splitter coupled to the fourth harmonic crystal, configured to separate the first fundamental optical beam and the fourth harmonic optical beam and further configured to couple the first fundamental optical beam to the first beam combiner of the third harmonic generator.

8. A cascaded harmonic generator for cascaded optical harmonic generation from a main optical beam, the cascaded harmonic generator comprising:

a higher harmonic generator disposed in a path of the main optical beam and configured to generate a higher harmonic optical beam while transmitting a residual lower harmonic optical beam;

a lower harmonic generator disposed in the path of the main optical beam downstream of the higher harmonic generator, configured to generate a lower harmonic optical beam while transmitting a residual main optical beam;

a harmonic separator disposed in the path of the main optical beam between the higher and lower harmonic generators, configured to split the higher harmonic optical beam from the main optical beam propagated through the higher harmonic generator; and a harmonic combiner disposed in the path of the residual main optical beam downstream of the lower harmonic generator, configured to couple the lower harmonic optical beam generated by the lower harmonic generator to the higher harmonic generator configured to generate the higher harmonic optical beam.

9. The cascaded harmonic generator of claim 8, further comprising a first filter configured to separate the residual main optical beam from the lower harmonic optical beam exiting the lower harmonic generator to prevent the residual main optical beam from circulating around back to the higher harmonic generator.

10. The cascaded harmonic generator of claim 8, further comprising an optical dump configured to absorb the residual main optical beam exiting the lower harmonic generator.

11. The cascaded harmonic generator of claim 8, further comprising a second filter configured to separate the residual lower harmonic optical beam from the main optical beam exiting the higher harmonic generator to prevent the residual lower harmonic optical beam from circulating around back to the lower harmonic generator.

12. The cascaded harmonic generator of claim 8, wherein the lower harmonic generator comprises a lower harmonic crystal, and the higher harmonic generator comprises a higher harmonic crystal.

13. The cascaded harmonic generator of claim 12, wherein the higher harmonic crystal comprises an input face disposed substantially at a Brewster angle with respect to the lower harmonic optical beam.

14. The cascaded harmonic generator of claim 13, wherein a refractive index of the higher harmonic crystal is wavelength dependent, and wherein the main optical beam and the lower harmonic optical beam have different angles of incidence on the input face of the higher harmonic crystal, so that in operation, the main and lower harmonic optical beams are substantially collinear in the higher harmonic crystal.

15. The cascaded harmonic generator of claim 14, wherein the higher harmonic crystal includes an exit face at an acute angle to the path of the main optical beam, whereby during operation, the main optical beam, the residual lower harmonic optical beam and the higher harmonic optical beam exit the higher harmonic crystal at different angles configured to separate from the higher harmonic optical beam.

16. The cascaded harmonic generator of claim 12, wherein at least one of the higher and lower harmonic crystal comprises a periodically poled crystal.

17. The cascaded harmonic generator of claim 8, further comprising:

a pulsed light source configured to provide the main optical beam, wherein the main optical beam is pulsed at a pulse separation such that a light round trip time in an optical loop comprising the lower and higher harmonic generators is substantially an integer multiple of the pulse separation.

18. A method of cascaded optical harmonic generation from a main optical beam, the method comprising:

propagating a main optical beam in sequence through a higher harmonic generator and then through a lower harmonic generator, so as to generate a lower harmonic optical beam;

propagating the lower harmonic optical beam generated by the lower harmonic generator through the higher harmonic generator, such that the lower harmonic optical beam overlaps with the main optical beam in the higher harmonic generator, so as to generate the higher harmonic optical beam.

19. The method of claim 18, further comprising separating the main optical beam from the lower harmonic optical beam exiting the lower harmonic generator to prevent the main optical beam from circulating back around to the higher harmonic generator.

20. The method of claim 18, further comprising separating the lower harmonic optical beam from the main optical beam exiting the higher harmonic generator to prevent the lower harmonic optical beam from circulating back around to the lower harmonic generator.

21. The method of claim 18, further comprising directing the lower harmonic optical beam on the higher harmonic generator at an acute angle with the main optical beam, for collinear propagation in the higher harmonic generator.

22. The method of claim 18, further comprising pulsing the main optical beam at a pulse separation such that a light round trip time in an optical loop comprising the lower and higher harmonic generators is substantially an integer multiple of the pulse separation.

23. A method of cascaded optical harmonic generation from a main optical beam, the method comprising:

propagating the main optical beam through m harmonic generators, wherein m=2, ..., M, and M≥3, in the order of decreasing number m, starting from the $M^{th}$ harmonic generator and ending with a second harmonic generator;

propagating each $n^{th}$ harmonic optical beam, wherein n=2, ..., M−1, through the $(n+1)^{th}$ harmonic generator, so as to overlap therein with the main optical beam; and outputting the $M^{th}$ harmonic optical beam.

24. The method of claim 23, further comprising separating out residual main optical beam prior to the $M^{th}$ harmonic generator so that the residual main optical beam does not circulate back to the $M^{th}$ harmonic generator.

* * * * *